(12) United States Patent
Huang et al.

(10) Patent No.: US 8,542,277 B2
(45) Date of Patent: *Sep. 24, 2013

(54) CONTROLLING APPARATUS AND CONTROLLING METHOD FOR SIGNAL OUTPUTING CIRCUIT AND VIDEO SYSTEM

(75) Inventors: Chih-Chuan Huang, Hsinchu (TW); Hui-Wen Miao, Hsinchu (TW); Ko-Yang Tso, Zhonghe (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 21 days.

This patent is subject to a terminal disclaimer.

(21) Appl. No.: 13/168,202

(22) Filed: Jun. 24, 2011

(65) Prior Publication Data

US 2011/0254962 A1 Oct. 20, 2011

Related U.S. Application Data

(62) Division of application No. 12/427,525, filed on Apr. 21, 2009, now Pat. No. 8,233,253.

(30) Foreign Application Priority Data

Jun. 6, 2008 (TW) ................................ 97121097 A

(51) Int. Cl.
*H04N 17/04* (2006.01)
(52) U.S. Cl.
USPC ........................................................ 348/180

(58) Field of Classification Search
USPC ................................ 361/56, 57, 58; 345/204
See application file for complete search history.

(56) References Cited

U.S. PATENT DOCUMENTS

| | | | |
|---|---|---|---|
| 6,163,343 A * | 12/2000 | Jung | 348/515 |
| 6,310,753 B1 | 10/2001 | Dollar, II et al. | |
| 6,671,371 B1 | 12/2003 | McNeill et al. | |
| 7,378,977 B2 * | 5/2008 | Huang | 340/657 |
| 8,233,253 B2 * | 7/2012 | Huang et al. | 361/58 |
| 2005/0212789 A1 * | 9/2005 | Kim | 345/204 |

FOREIGN PATENT DOCUMENTS

TW 200502894 A 1/2005

OTHER PUBLICATIONS

Intellectual Property Office, Ministry of Economic Affairs, R.O.C., "Office Action", Feb. 8, 2012, Taiwan.

* cited by examiner

*Primary Examiner* — Rexford Barnie
*Assistant Examiner* — Angela Brooks

(57) ABSTRACT

The invention discloses a controlling apparatus for a signal outputting circuit in an electronic system. The controlling apparatus includes a detecting circuit, a switch, and a controlling circuit. The detecting circuit is used for detecting whether the electronic system has an abnormal condition. The switch is electrically connected between a signal receiving terminal and the signal outputting circuit. The controlling circuit is electrically connected between the detecting circuit and the switch. Once the detecting circuit detects that the electronic system has the abnormal condition, the controlling circuit sets the switch into a high-impedance state.

4 Claims, 7 Drawing Sheets

CONTROLLING APPARATUS AND CONTROLLING METHOD FOR SIGNAL OUTPUTING CIRCUIT AND VIDEO SYSTEM

CROSS-REFERENCE TO RELATED PATENT APPLICATION

This application is a divisional application of U.S. patent application Ser. No. 12/427,525, filed Apr. 21, 2009, now U.S. Pat. No. 8,233,253, the entire contents of which are incorporated herein in their entireties by reference.

BACKGROUND OF THE INVENTION

1. Field of the Invention

The present invention relates to an electronic system, and more particularly, to a signal outputting circuit of the electronic system.

2. Description of the Prior Art

The electro-static discharge (ESD) refers to the charge transfer phenomenon caused by objects with different electro-static potentials approaching each other or contacting each other directly. In recent years, with the rapid development of the technology, the microelectronic technique has been extensively applied and the electromagnetic environment has become more and more complex. As a result, the problems caused by the ESD in electronic products have attracted more and more attentions.

The interferences of the ESD on circuits are divided into two situations. In one situation, the ESD current passes the circuits directly to cause damages. In the other situation, the electromagnetic field induced by the ESD current disturbs the circuits by ways of a capacitance coupling, an inductance coupling, and a space radiation coupling, etc.

Generally, static electricity with different levels exists in humans and environments. When the accumulated static electricity reaches to a certain amount and then is contact with electronic devices, a discharge phenomenon will happen instantaneously. This natural discharge phenomenon will cause electronic devices, such as computers, mobile phones, PDAs or liquid crystal screens, etc, damaged seriously or work improperly.

For example, if the liquid crystal display system is interfered by the ESD, then the interference may further affect the chip circuit in the video system, and the signals, transmitted from the image processing circuit to the liquid crystal screen, are disturbed to generate errors. The abnormal signals may cause twinkling or unstable display, and may further affect the displaying property of the screen.

SUMMARY OF THE INVENTION

In order to solve the above-mentioned problem, the present invention is to provide a controlling apparatus, and the controlling apparatus of the invention can be adapted to a signal outputting circuit in the video system. The controlling apparatus is for selectively controlling the switch connected to the signal outputting circuit according to whether an electronic system has an abnormal condition.

According to an embodiment of the invention, it is related to a controlling apparatus for a signal outputting circuit. The signal outputting circuit is located in an electronic system. The controlling apparatus comprises a detecting circuit, a switch and a controlling circuit. The detecting circuit is used for detecting that whether the electronic system has an abnormal condition. The switch is electrically connected between a signal receiving terminal and the signal outputting circuit. The controlling circuit is electrically connected between the detecting circuit and the switch. Once the detecting circuit detects that the electronic system has the abnormal condition, the controlling circuit sets the switch into a high-impedance state.

According to another embodiment of the invention, it is related to a video system. The video system comprises an image outputting circuit, a detecting circuit, a switch and a controlling circuit. The detecting circuit is used for detecting that whether the video system has an abnormal condition. The switch is electrically connected between a signal receiving terminal and the image outputting circuit. The controlling circuit is electrically connected between the detecting circuit and the switch, and once the detecting circuit detects that the video system has the abnormal condition, the controlling circuit sets the switch into a high-impedance state.

According to the invention, when the electronic system has the abnormal condition, the signal transmission to the signal outputting circuit or the signal transmission from the signal outputting circuit will be provisionally ceased until the abnormal condition is eliminated. By this action, erroneous output signals can be avoided to output to the video system to cause twinkling or unstable display.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
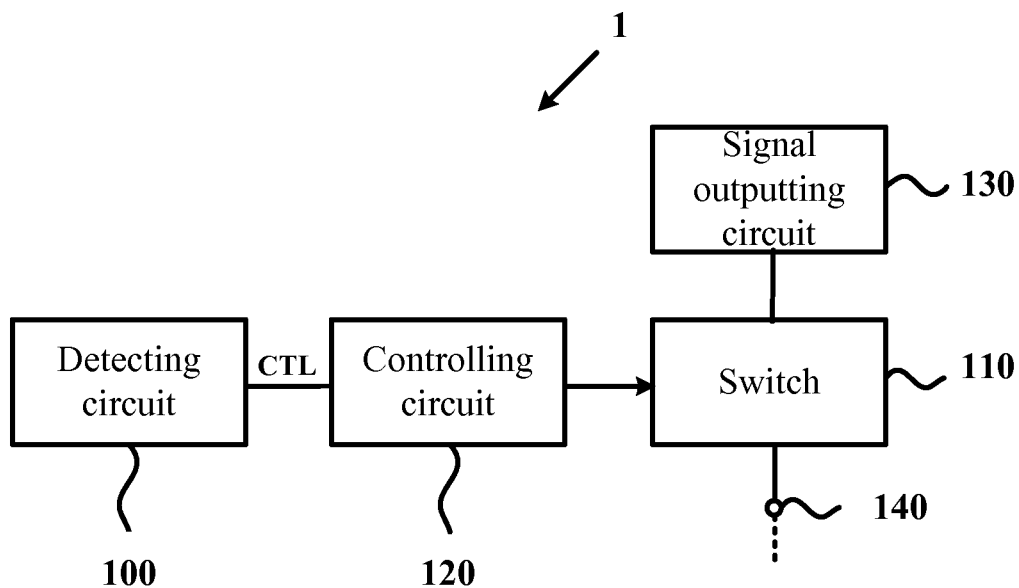
FIG. 1(A) is a schematic diagram illustrating the controlling apparatus according to an embodiment of the invention.

Please refer to FIG. 1(A). FIG. 1(A) is a schematic diagram illustrating the controlling apparatus according to an embodiment of the invention. The controlling apparatus 1 is adapted to be disposed at a signal outputting circuit 130 in an electronic system. The controlling apparatus 1 comprises a detecting circuit 100, a switch 110 and a controlling circuit 120. The switch 110 is electrically connected between a signal receiving terminal 140 and the signal outputting circuit 130.

The detecting circuit 100 is used for detecting that whether the electronic system has an abnormal condition, such as an electro-static discharge (ESD) condition. When the detecting circuit 100 detects that the abnormal condition does not exist in the electronic system, the controlling circuit 120 will set the switch 110 into a short-circuited state, and then the signal transmitting between the signal outputting circuit 130 and the signal receiving terminal 140 is allowable. In practice, the signal receiving terminal 140 can be a circuit node inside a screen used for receiving data from the signal outputting circuit 130. Otherwise, the signal receiving terminal 140 can be a circuit node of the signal outputting circuit 130 used for receiving data from other circuits.

Once the electronic system has the abnormal condition, the controlling circuit 120 sets the switch 110 into a high-impedance state, which disconnects the signal outputting circuit 130 and the signal receiving terminal 140. Therefore, the signal transmission to the signal outputting circuit 130 or the signal transmission from the signal outputting circuit 130 will be provisionally ceased. Not until the detecting circuit 100 detects the abnormal condition has been eliminated or lessened, does the controlling circuit 120 reset the switch 110 into the short-circuited state, and then the signal transmitting between the signal outputting circuit 130 and the signal receiving terminal 140 is allowable again.

Figure 1B:
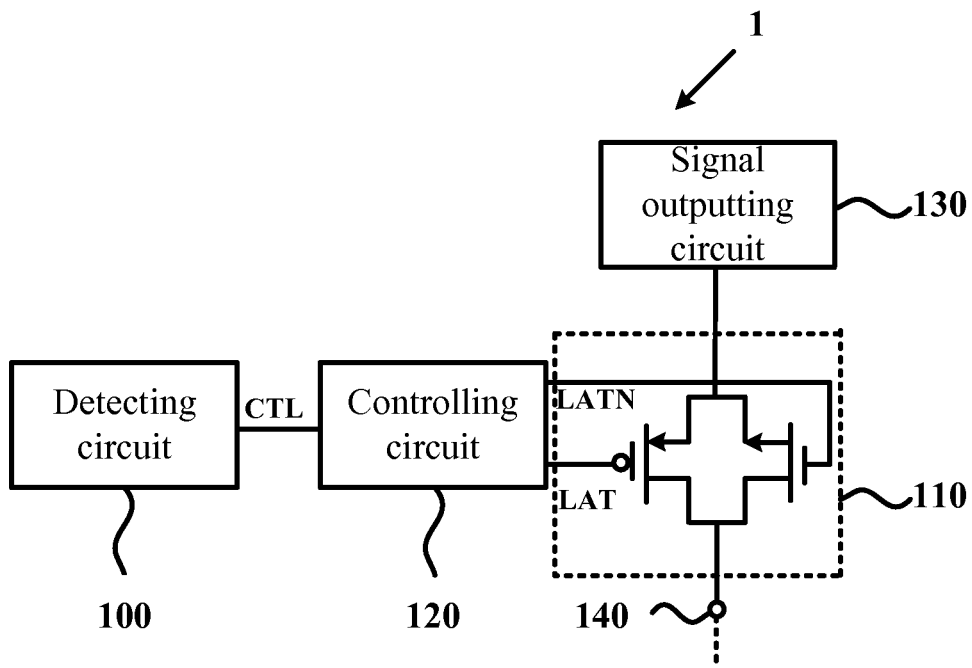
FIG. 1(B) is a circuit example of the switch in the controlling apparatus according to the invention.

In practice, the switch 110 can be a transmission gate, but not limited herein. Please refer to FIG. 1(B). FIG. 1(B) is a circuit example of the switch. As shown in FIG. 1(B), the detecting circuit 100 generates a controlling signal CTL according to whether the electronic system has the abnormal condition. The controlling circuit 120 generates the controlling signals LAT and LATN for controlling the switch 110 according to the controlling signal CTL.

In this example, the controlling signals LAT and LATN have opposite potentials. When the controlling signal LAT is a low-potential signal and the controlling signal LATN is a high-potential signal, the transmission gate will be short. When the controlling signal LAT is a high-potential signal and the controlling signal LATN is a low-potential signal, the transmission gate is cut-off (i.e. the high-impedance state).

Figure 1C:
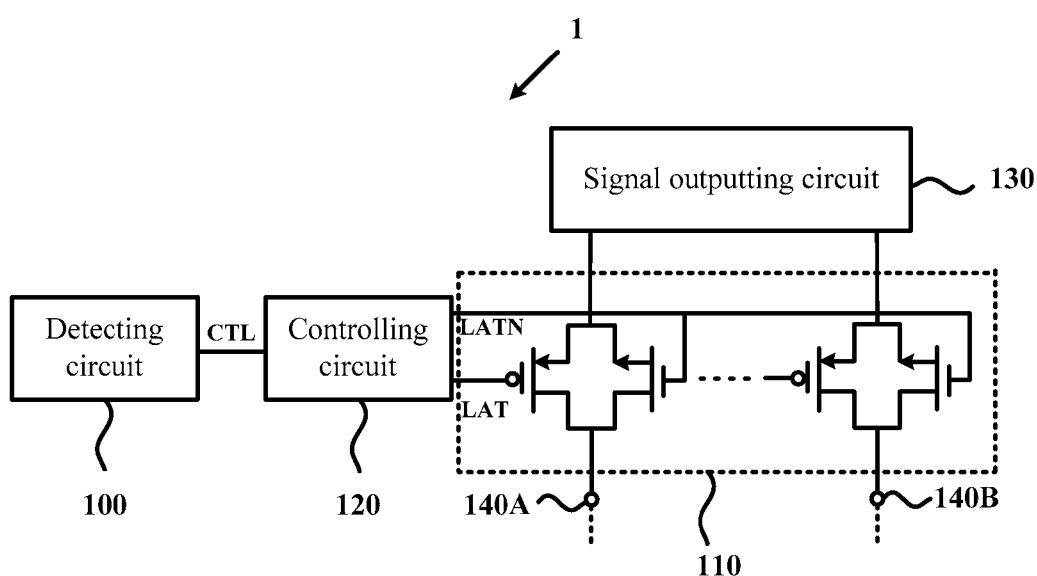
FIG. 1(C) illustrates the schematic of the signal outputting circuit having a plurality of input/output ends.

FIG. 1(C) illustrates the schematic of the signal outputting circuit 130 having a plurality of input/output ends. As shown in FIG. 1(C), each of the input/output ends in the signal outputting circuit 130 is connected to a transmission gate, and the transmission gates are controlled by the controlling circuit 120. The circuit in FIG. 1(C) and the circuit in FIG. 1(B) are operated in the same way. The controlling circuit 120 generates the controlling signals LAT and LATN, according to the controlling signal CTL, for controlling the transmission gates to synchronously turn on/turn off. Thereby, the signal outputting circuit 130 and each of the signal receiving terminal (such as 140A and 140B) are connected or disconnected.

Figure 2A:
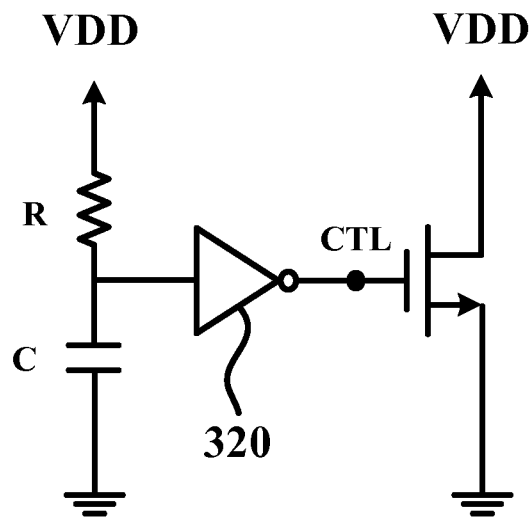
FIG. 2(A) illustrates a circuit example of the detecting circuit and controlling circuit of the controlling apparatus.
Figure 2B:
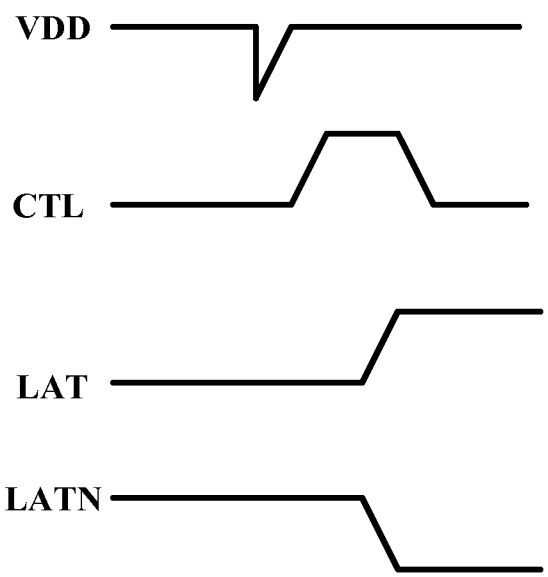
FIG. 2(B) is a timing diagram example illustrating the controlling signals of the invention.

Please refer to FIG. 2(A). FIG. 2(A) illustrates a circuit example of the detecting circuit and controlling circuit of the controlling apparatus. In the example, the detecting circuit and the controlling circuit are consisted of resisters (R), capacitors (C), an inverter 320 and an NMOS transistor. FIG. 2(B) is a timing diagram example illustrating the controlling signals. When the voltage source VDD in FIG. 2(A) is interfered and has a transient voltage drop, the outputting voltage (i.e. the controlling signal CTL) of the inverter will correspondingly vary from a low-potential to a high-potential.

No matter in analog circuits or digital circuits, the fluctuation of the voltage VDD may be influenced by the environment to make the signal outputting circuit 130 work improperly. According to the voltage change of the controlling signal CLT, the controlling circuit 120 sets the switch 110 into a high-impedance state through the controlling signals LAT and LATN for cutting the signal transmission off.

Figure 3A:
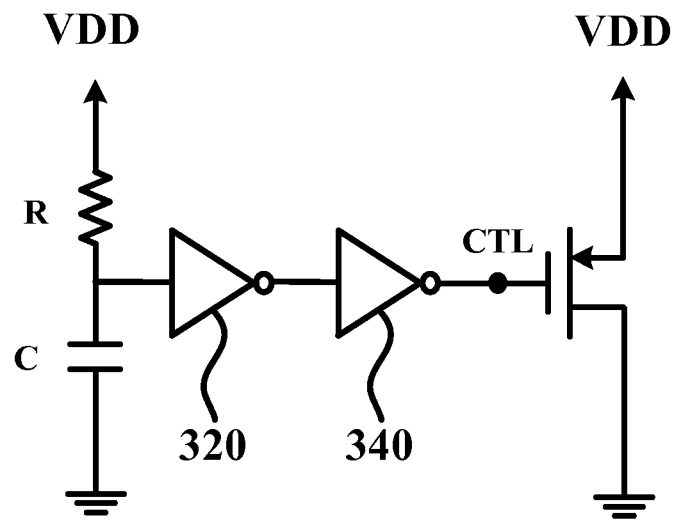
FIG. 3(A) illustrates another circuit example of the detecting circuit and the controlling circuit of the controlling apparatus.
Figure 3B:
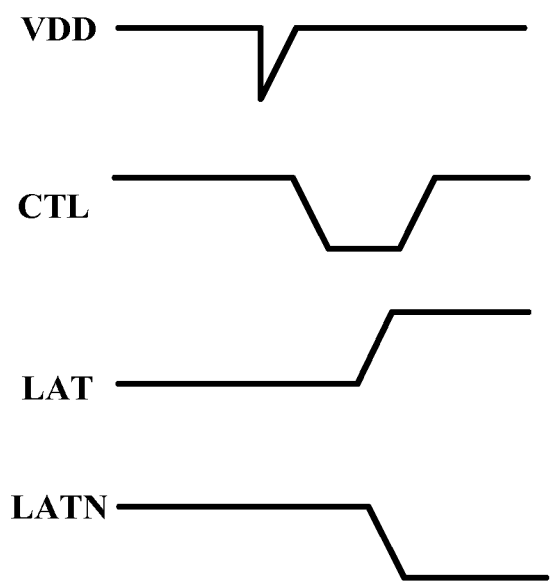
FIG. 3(B) is another timing diagram example illustrating the controlling signals of the invention.

FIG. 3(A) illustrates another circuit example of the detecting circuit and the controlling circuit of the controlling apparatus. In the example, the detecting circuit and the controlling circuit are consisted of resisters (R), capacitors (C), two inverters (320, 340) and a PMOS transistor. FIG. 3(B) is another timing diagram example illustrating the controlling signals.

Similarly, when the voltage source VDD in FIG. 3(A) is interfered and has a transient voltage drop, the voltage drop will cause a low-potential pulse at the output end of the inverter 340. Namely, a low-potential pulse occurs in the controlling signal CTL. The impulse is used to indicate that that the voltage VDD has an abnormal condition. Accordingly, the controlling circuit 120 sets the switch 110 into a high-impedance state through the controlling signals LAT and LATN for terminating the transmission of erroneous signals.

Figure 4A:
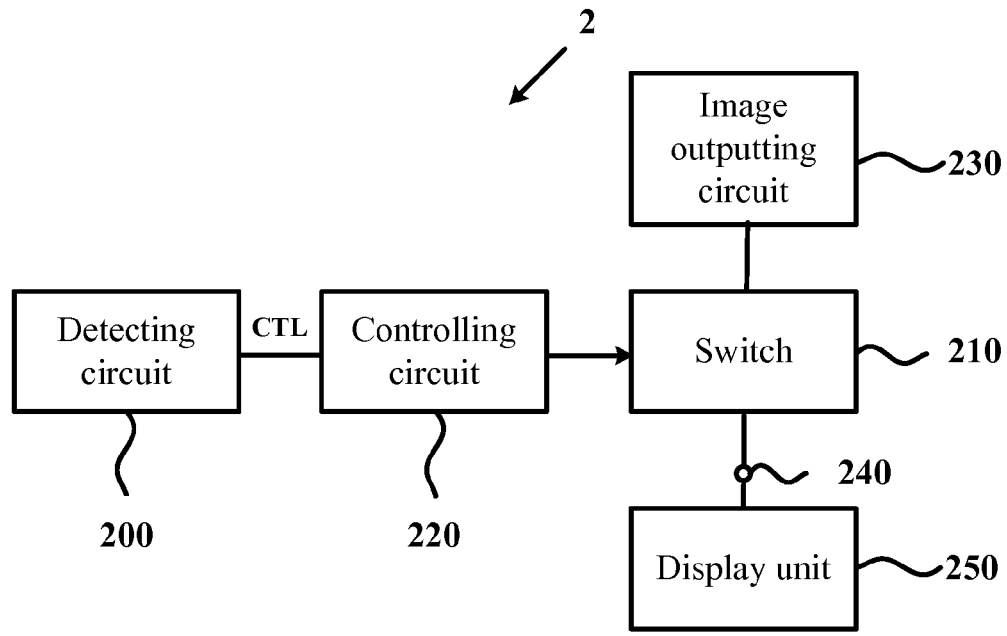
FIG. 4(A) is a schematic diagram illustrating the video system according to an embodiment of the invention.

The controlling apparatus of the invention is applicative in a video system, such as a liquid crystal display system. FIG. 4(A) is a schematic diagram illustrating the video system according to another embodiment of the invention. The video system 2 comprises a detecting circuit 200, a switch 210, a controlling circuit 220, an image outputting circuit 230 and a display unit 250. The switch 210 is electrically connected between the image outputting circuit 230 and a signal receiving terminal 240 of the display unit 250.

Figure 4B:
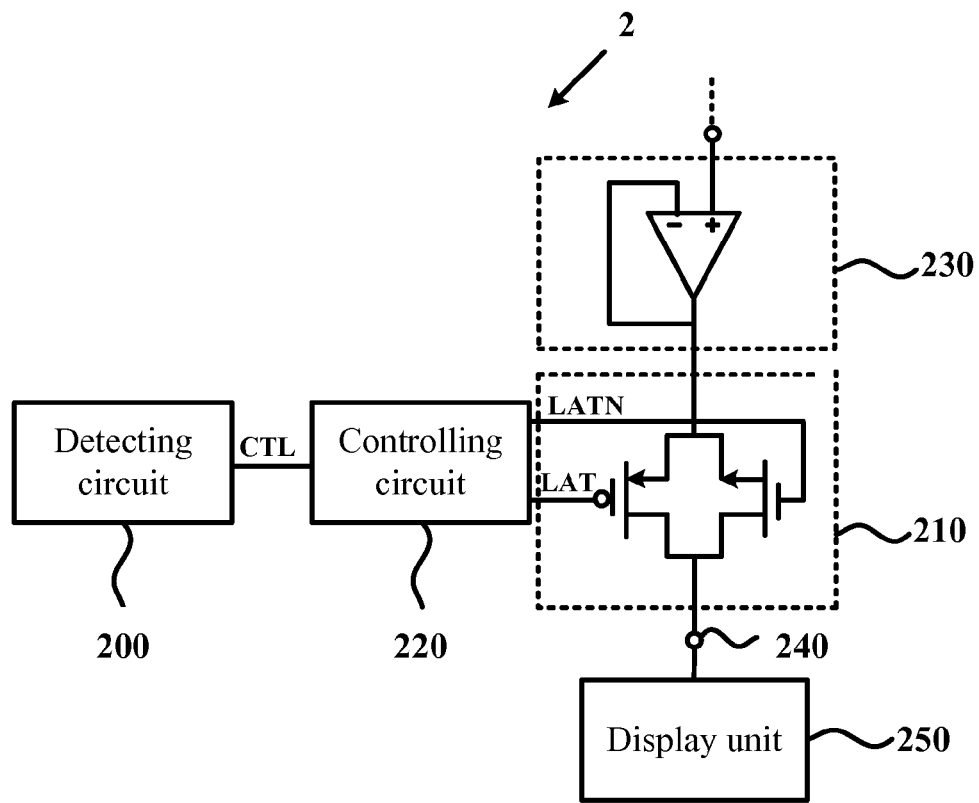
FIG. 4(B) is a partial circuit example illustrating the video system of the invention.

FIG. 4(B) illustrates a partial circuit example of the video system 2. In the example, the image outputting circuit 230 comprises a buffer circuit consisting of an operational amplifier, and the switch 210 consists of transmission gates. If the detecting circuit 200 does not judge that the video system 2 has an abnormal condition, the controlling circuit 220 sets the transmission gate 210 into a short-circuited state, so that the image signal from the image outputting circuit 230 can be transmitted through the transmission gate 210 and the signal receiving terminal 240 into the display unit 250. For example, the display unit 250 could be a monitor, a mobile phone screen, etc.

Figure 5:
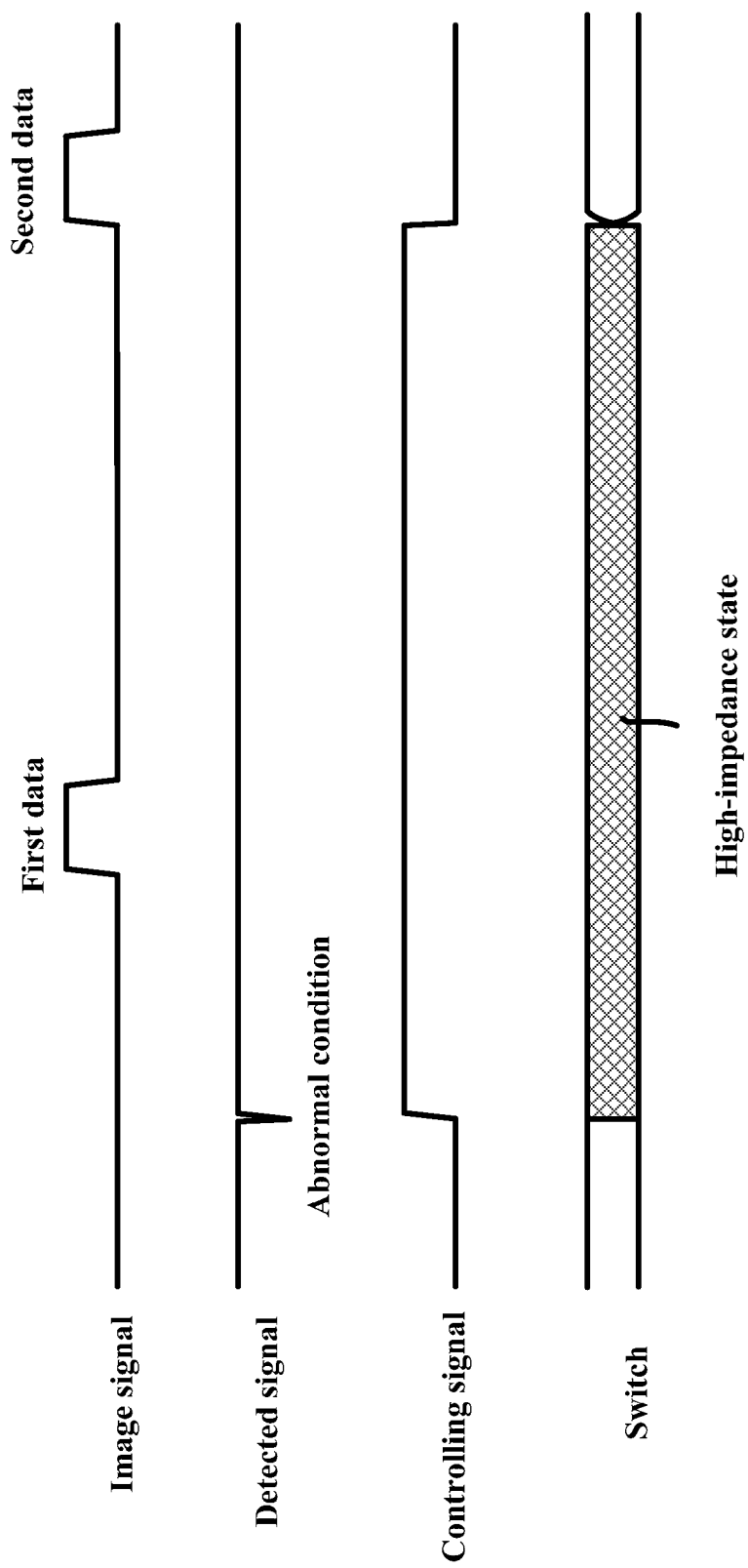
FIG. 5 is a signal timing diagram example in the video system of the invention.

FIG. 5 is a signal timing diagram example in the video system 2. When the detecting circuit 200 detects that the video system 2 does have an abnormal condition, the controlling circuit 220 will send out a high-potential controlling signal for setting the switch 210 into a high-impedance state, so as to terminate the output of first data in the image signal no matter whether the first data has faults due to the abnormal condition.

After a period of time, e.g. 15 milliseconds, next data (i.e. second data) is generated. If the detecting circuit 200 does not judge that the video system 2 has the abnormal condition, the controlling circuit 220 will make the controlling signal have a low potential for setting the switch 210 into a short-circuited state, which will let the second data transmit through the switch 210 successfully. For example, when the video system 2 has an ESD condition, the controlling circuit 220 can control the switch 210 to be opened transiently, and thus erroneous output signals can be avoided to output to the display unit 250 to cause twinkling or unstable display.

Figure 6:
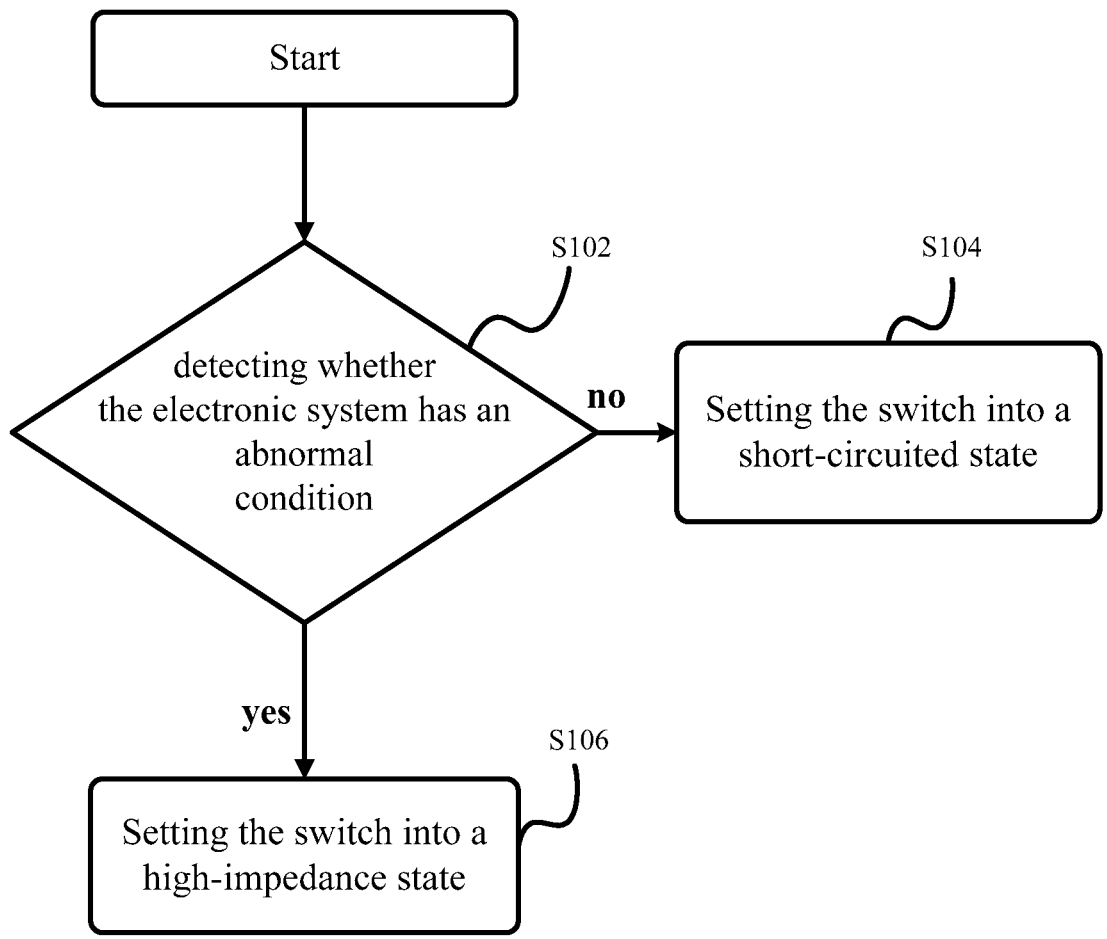
FIG. 6 is a flow chart illustrating a controlling method according to an embodiment of the invention.

FIG. 6 is a flow chart illustrating a controlling method according to an embodiment of the invention. Firstly, step S102 is performed to detect whether an electronic system has an abnormal condition. In practice, the abnormal condition could be an ESD condition. If NO in step S102, step S104 is performed to set a switch, electrically connected between a signal receiving terminal and a signal outputting circuit, into a short-circuited state. If YES in step S102, step S106 is performed to set the switch into a high-impedance state.

According to the invention, when the electronic system has the abnormal condition, the signal transmission to the signal outputting circuit or the signal transmission from the signal outputting circuit will be provisionally ceased until the abnormal condition is eliminated. By this action, erroneous output signals can be avoided to output to the video system to cause twinkling or unstable display.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video system comprising:
   an image outputting circuit;
   a detecting circuit for detecting whether the video system has an abnormal condition;
   a switch, electrically connected between a signal receiving terminal and the image outputting circuit; and
   a controlling circuit, electrically connected between the detecting circuit and the switch, once the detecting circuit detects that the video system has the abnormal condition, the controlling circuit generating a high-potential controlling signal and a low-potential controlling signal to two ends of the switch respectively for setting the switch into a high-impedance state.

2. The video system of claim 1, wherein the detecting circuit is used for detecting whether the video system has an electro-static discharge condition.

3. The video system of claim 1, wherein if the detecting circuit does not judge that the video system has the abnormal condition, the controlling circuit sets the switch into a short-circuited state.

4. The video system of claim 1, wherein the switch is a transmission gate.

* * * * *